US012771042B2

(12) United States Patent
Lin et al.

(10) Patent No.: US 12,771,042 B2
(45) Date of Patent: Oct. 20, 2026

(54) MULTIFUNCTIONAL RECONFIGURABLE REFLECTARRAY STRUCTURE AND CONTROL CIRCUIT HAVING MULTIFUNCTIONAL RECONFIGURABLE REFLECTARRAY STRUCTURE

(71) Applicant: NATIONAL CHUNG CHENG UNIVERSITY, Chiayi (TW)

(72) Inventors: Shih-Cheng Lin, Taitung County (TW); Sheng-Fuh Chang, Chiayi County (TW); Chia-Chan Chang, Chiayi City (TW); Yuan-Chun Lin, Hsinchu County (TW); Ting-Hao Shih, Tainan (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 86 days.

(21) Appl. No.: 18/822,284

(22) Filed: Sep. 2, 2024

(65) Prior Publication Data

US 2025/0233316 A1 Jul. 17, 2025

(30) Foreign Application Priority Data

Jan. 17, 2024 (TW) ................................. 113101871

(51) Int. Cl.
*H01Q 15/14* (2006.01)
*H01Q 23/00* (2006.01)

(52) U.S. Cl.
CPC ........... *H01Q 15/148* (2013.01); *H01Q 23/00* (2013.01)

(58) Field of Classification Search
CPC .... H01Q 15/148; H01Q 23/00; H01Q 21/245; H01Q 3/46; H01Q 15/002
See application file for complete search history.

(56) References Cited

U.S. PATENT DOCUMENTS

2004/0263408 A1 12/2004 Sievenpiper et al.
2021/0181335 A1 6/2021 Lee et al.
2022/0337240 A1* 10/2022 Venkatesh ................ H03H 1/00

FOREIGN PATENT DOCUMENTS

CN 114267957 A * 4/2022
CN 115395245 A * 11/2022 ........... H01Q 15/002
(Continued)

OTHER PUBLICATIONS

A 1-bit 14×14 dual-beam electronically reconfigurable reflectarray—Lu (Year: 2022).*

*Primary Examiner* — Dimary S Lopez Cruz
*Assistant Examiner* — Anna N Hamadyk
(74) *Attorney, Agent, or Firm* — CKC & Partners Co., LLC

(57) ABSTRACT

A multifunctional reconfigurable reflectarray structure (RRA) includes a radiation layer and a direct current bias layer. The radiation layer includes a first metal member, a second metal member, a first diode and a second diode. The first diode is connected between the first metal member and the second metal member. The second diode is coupled to the second metal member. The direct current bias layer is connected to the first diode and the second diode. A first working state of the first diode and a second working state of the second diode are controlled by a first input signal and a second input signal. The radiation layer is modulated according to the first working state and second working state, so that an electromagnetic wave forms one of a single-beam reflection and a dual-beam reflection after being incident on the radiation layer, or is absorbed by the radiation layer.

14 Claims, 14 Drawing Sheets

(56) References Cited

FOREIGN PATENT DOCUMENTS

| | | | | | |
|---|---|---|---|---|---|
| CN | 116387853 | A | | 7/2023 | |
| CN | 116598791 | A | | 8/2023 | |
| CN | 117276904 | A | * | 12/2023 | ......... H01Q 15/0086 |
| JP | 2017-05670 | A | | 1/2017 | |
| JP | 2023-138311 | A | | 10/2023 | |
| WO | 2020/223450 | A1 | | 11/2020 | |
| WO | 2022/236380 | A1 | | 11/2022 | |

* cited by examiner

MULTIFUNCTIONAL RECONFIGURABLE REFLECTARRAY STRUCTURE AND CONTROL CIRCUIT HAVING MULTIFUNCTIONAL RECONFIGURABLE REFLECTARRAY STRUCTURE

RELATED APPLICATIONS

This application claims priority to Taiwan Application Serial Number 113101871, filed Jan. 17, 2024, which is herein incorporated by reference.

BACKGROUND

Technical Field

The present disclosure relates to a reconfigurable intelligent surface (RIS) technology. More particularly, the present disclosure relates to a multifunctional reconfigurable reflectarray structure and a control circuit having the multifunctional reconfigurable reflectarray structure.

Description of Related Art

With the arrival of the sixth generation (6G) mobile communications, in order to improve transmission efficiency and system throughput and optimize the transmission quality of communication networks, spectrum resources are increasingly used in millimeter wave frequency bands. However, signals in the frequency bands are subject to path loss in the communication environment and easily affected by the surrounding environment, resulting in communication blind spots, which in turn may lead to user interruptions. Although Massive MIMO technology has been used to increase the throughput of wireless communication systems, if we continue to deploy base stations to increase coverage as a way to increase efficiency, it may cause mutual interference between base stations and the problem of excessive hardware costs, which will reduce the efficiency of the overall network deployment.

Therefore, a multifunctional reconfigurable reflectarray structure and a control circuit having the multifunctional reconfigurable reflectarray structure with low-cost, low power consumption and easy-to-deploy in any communication environment scenario are commercially desirable.

SUMMARY

According to one aspect of the present disclosure, a multifunctional reconfigurable reflectarray (RRA) structure includes a radiation layer and a direct current bias layer. The radiation layer is configured to receive an electromagnetic wave from an electromagnetic wave source, and includes a first metal member, a second metal member, a first diode and a second diode. The second metal member is symmetrically disposed with the first metal member. The first diode is connected between the first metal member and the second metal member. The second diode is coupled to the second metal member. The direct current bias layer includes a first voltage input end and a second voltage input end. The first voltage input end is electrically connected to the first diode and provides a first input signal. The second voltage input end is electrically connected to the second diode and provides a second input signal. A first working state of the first diode and a second working state of the second diode are respectively controlled by the first input signal and the second input signal. The radiation layer is modulated according to the first working state and the second working state, so that the electromagnetic wave forms one of a single-beam reflection and a dual-beam reflection after being incident on the radiation layer, or is absorbed by the radiation layer.

According to another aspect of the present disclosure, a control circuit having a multifunctional reconfigurable reflectarray (RRA) structure includes the multifunctional RRA structure and a control module. The multifunctional RRA structure includes a radiation layer and a direct current bias layer. The radiation layer is configured to receive an electromagnetic wave from an electromagnetic wave source, and includes a first metal member, a second metal member, a first diode and a second diode. The second metal member is symmetrically disposed with the first metal member. The first diode is connected between the first metal member and the second metal member. The second diode is coupled to the second metal member. The direct current bias layer includes a first voltage input end and a second voltage input end. The first voltage input end is electrically connected to the first diode. The second voltage input end is electrically connected to the second diode. The control module is connected to the first voltage input end and the second voltage input end to respectively provide a first input signal and a second input signal. A first working state of the first diode and a second working state of the second diode are respectively controlled by the first input signal and the second input signal. The radiation layer is modulated according to the first working state and the second working state, so that the electromagnetic wave forms one of a single-beam reflection and a dual-beam reflection after being incident on the radiation layer, or is absorbed by the radiation layer.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
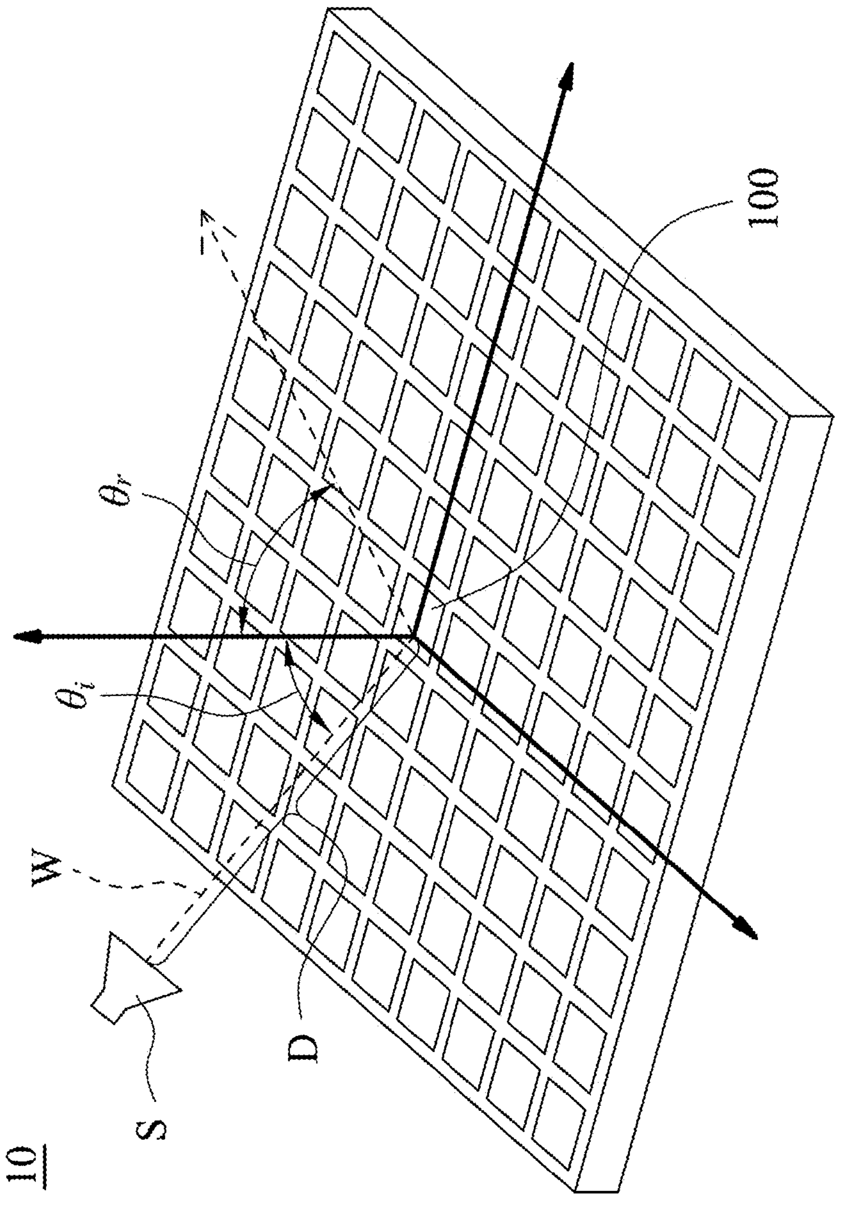
FIG. 1 shows a three-dimensional schematic view of a reconfigurable intelligent surface (RIS) according to a first embodiment of the present disclosure.
Figure 2:
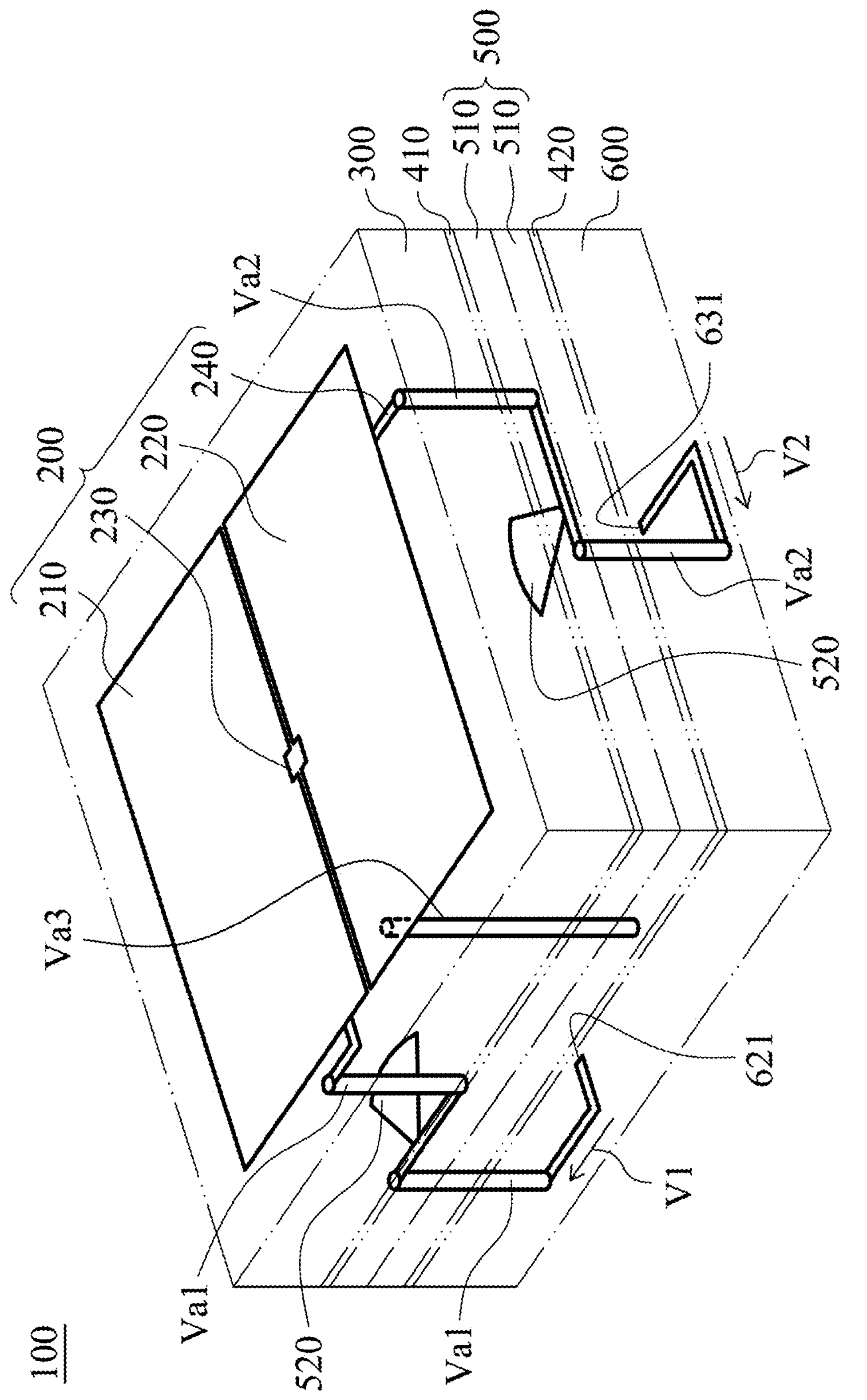
FIG. 2 shows a three-dimensional schematic view of a multifunctional reconfigurable reflectarray (RRA) structure of the RIS of FIG. 1.
Figure 3:
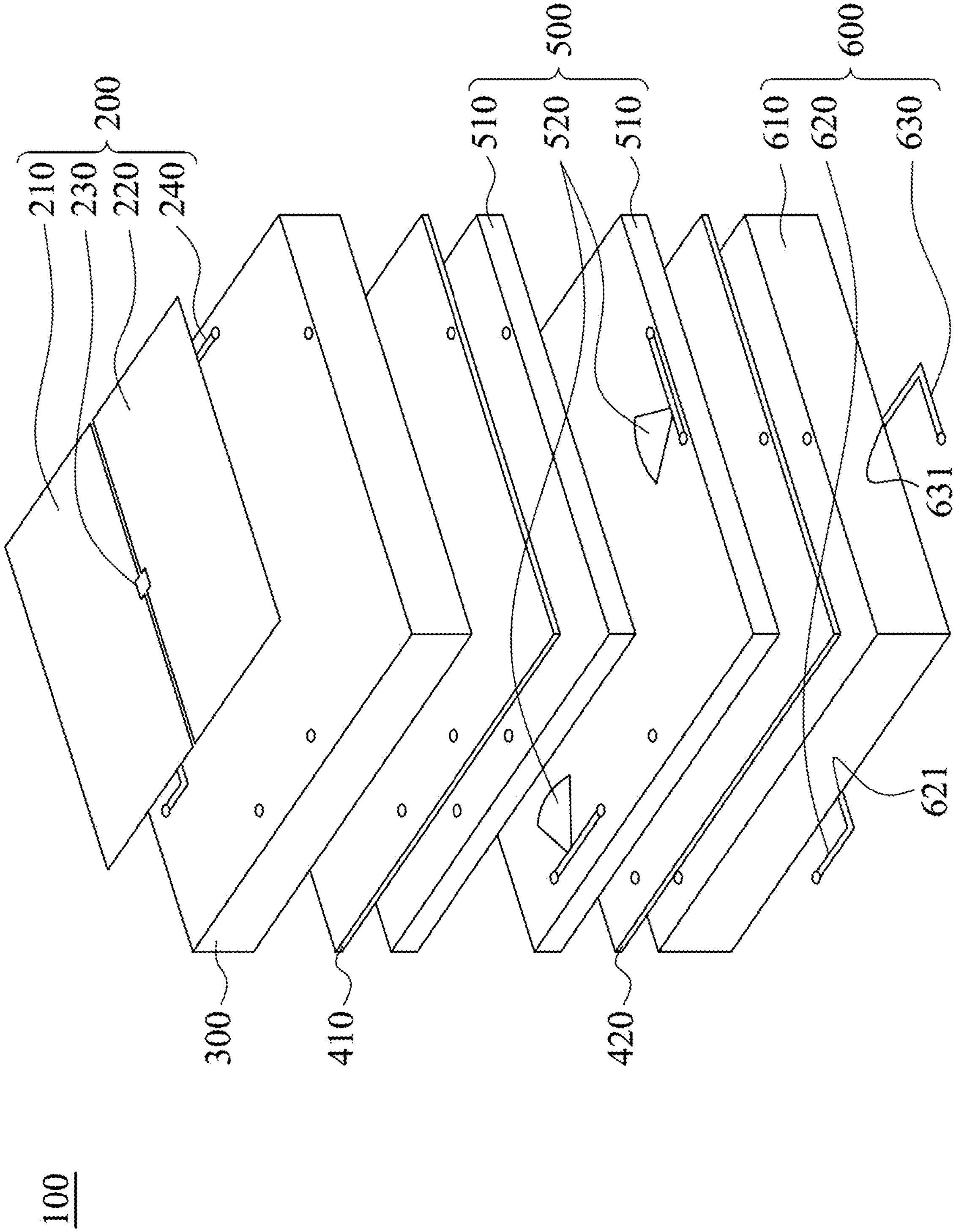
FIG. 3 shows an exploded view of the multifunctional RRA structure of FIG. 2.
Figure 4:
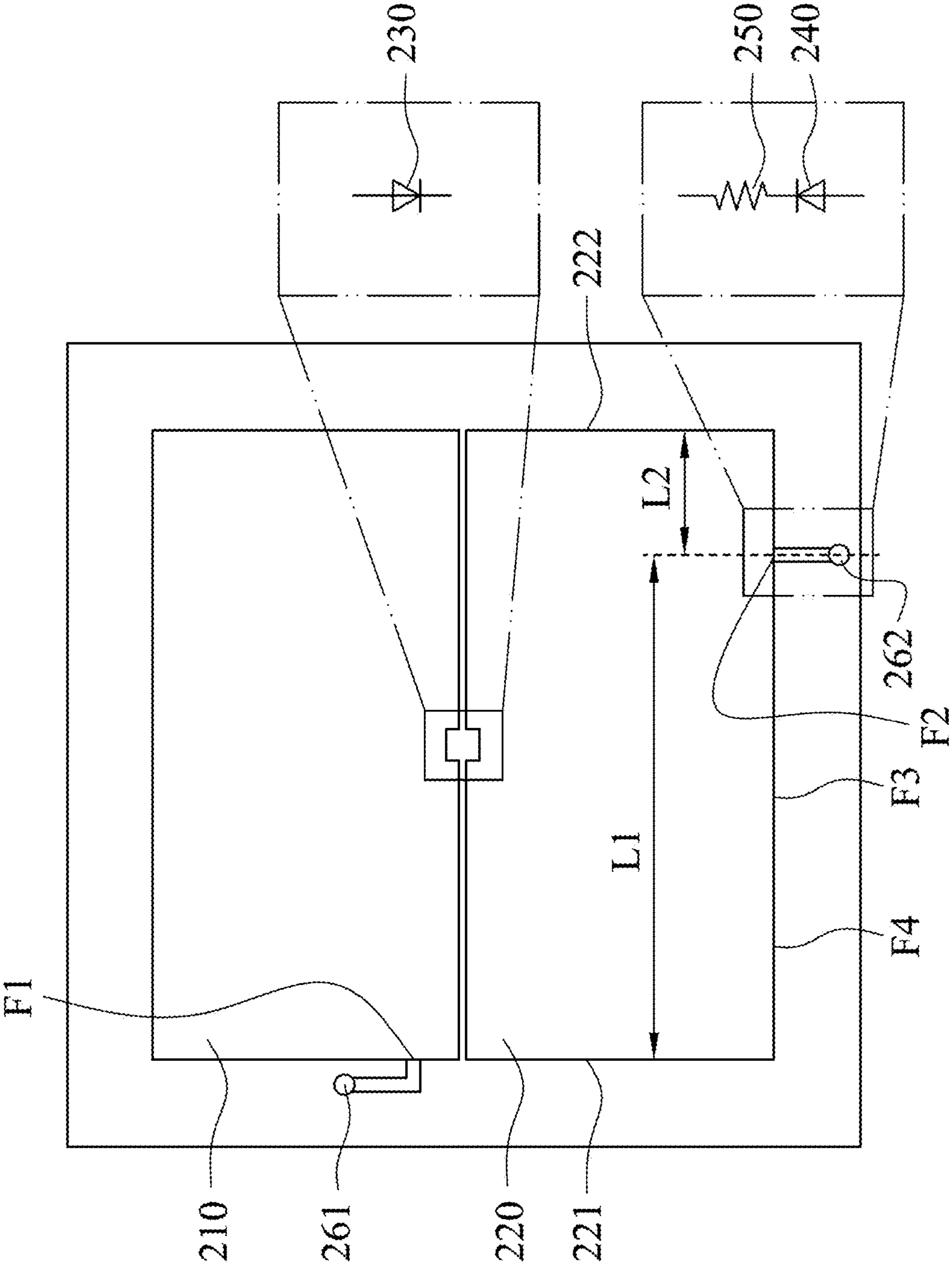
FIG. 4 shows a top view of the multifunctional RRA structure of FIG. 2.

Reference is made to FIGS. 1, 2, 3 and 4. FIG. 1 shows a three-dimensional schematic view of a reconfigurable intelligent surface (RIS) 10 according to a first embodiment of the present disclosure. FIG. 2 shows a three-dimensional schematic view of a multifunctional reconfigurable reflectarray (RRA) structure 100 of the RIS 10 of FIG. 1. FIG. 3 shows an exploded view of the multifunctional RRA structure 100 of FIG. 2. FIG. 4 shows a top view of the multifunctional RRA structure 100 of FIG. 2. As shown in FIGS. 1 to 4, the RIS 10 is composed of a plurality of the multifunctional RRA structures 100 and can be applied to frequency range 1 (FR1) in 5G NR band. The multifunctional RRA structure 100 is a stacked structure and includes a radiation layer 200, a dielectric layer 300, a first ground layer 410, a radio frequency suppression layer 500, a second ground layer 420 and a direct current (DC) bias layer 600 disposed in sequence.

The upper surface of the dielectric layer 300 is connected to the lower surface of the radiation layer 200. The upper surface of the first ground layer 410 is connected to the lower surface of the dielectric layer 300. The upper surface of the radio frequency suppression layer 500 is connected to the lower surface of the first ground layer 410. The upper surface of the second ground layer 420 is connected to the lower surface of the radio frequency suppression layer 500, and the lower surface of the second ground layer 420 is connected to the upper surface of the DC bias layer 600.

The radiation layer 200 is configured to receive an electromagnetic wave W emitted from an electromagnetic wave source S (such as a horn antenna). The radiation layer 200 includes a first metal member 210, a second metal member 220, a first diode 230 and a second diode 240. The second metal member 220 is symmetrically disposed with the first metal member 210, and each of the first metal member 210 and the second metal member 220 can be a metal patch. The first diode 230 is connected between the first metal member 210 and the second metal member 220. The second diode 240 is coupled to the second metal member 220.

The dielectric layer 300 can be, but is not limited to Rogers Corporation. RO4003C high-frequency board or other dielectric material substrate, and its dielectric constant can be determined according to actual requirements. Each of the first ground layer 410 and the second ground layer 420 can be a metal substrate and configured to be connected to the ground. The radio frequency suppression layer 500 includes two substrates 510 and two radio frequency choke units 520. The two substrates 510 are stacked on each other, and can be, but are not limited to a glass fiber unclad laminate (e.g., Flame Retardant 4 (FR4)). Each of the two radio frequency choke units 520 can be a radio frequency choke and disposed between the two substrates 510. Each of the two radio frequency choke units 520 has a fan shape and is configured to suppress a high-frequency signal of the radiation layer 200 (that is, suppressing high-frequency signals generated by the radiation layer 200) or block AC voltage from flowing into the DC bias layer 600 having low-frequency signals or DC voltage.

The DC bias layer 600 can include a substrate 610, a first metal line 620 and a second metal line 630. The substrate 610 can be, but is not limited to FR4. The first metal line 620 and the second metal line 630 are both disposed on the substrate 610. The first metal line 620 includes a first voltage input end 621, and the second metal line 630 includes a second voltage input end 631. The first voltage input end 621 is electrically connected to the first diode 230 and provides a first input signal V1 to the first diode 230. The second voltage input end 631 is electrically connected to the second diode 240 and provides a second input signal V2 to the second diode 240.

In particular, the multifunctional RRA structure 100 can further include two first conductive via holes Va1, two second conductive via holes Va2 and a third conductive via hole Va3. The radiation layer 200 can further include an absorption resistor 250. The absorption resistor 250 is connected between the second metal member 220 and the second diode 240. One of the two first conductive via holes Va1 and one of the two second conductive via holes Va2 both penetrate the dielectric layer 300, the first ground layer 410 and one of the substrates 510 of the radio frequency suppression layer 500. The other of the two first conductive via holes Va1 and the other of the two second conductive via holes Va2 both penetrate the other of the substrates 510 of the radio frequency suppression layer 500, the second ground layer 420 and the DC bias layer 600. The third conductive via hole Va3 penetrates the dielectric layer 300, the first ground layer 410 and the two substrates 510 of the radio frequency suppression layer 500.

Each of the first metal member 210 and the second metal member 220 has a rectangular shape. A short side of the first metal member 210 has a first feed point F1. The first feed point F1 can be electrically connected to the first voltage input end 621 through the two first conductive via holes Va1, so that an anode end of the first diode 230 receives the first input signal V1.

The second metal member 220 can be electrically connected to the second ground layer 420 through the third conductive via hole Va3, and a long side of the second metal member 220 has a second feed point F2. The second feed point F2 is coupled to the second diode 240 (that is, the second feed point F2 is connected to the absorption resistor 250, and the absorption resistor 250 is connected to the second diode 240). The second diode 240 is electrically connected to the second voltage input end 631 through the two second conductive via holes Va2, so that an anode end of the second diode 240 receives the second input signal V2. The second feed point F2 can also be electrically connected to the second voltage input end 631 through the absorption resistor 250, the second diode 240 and the two second conductive via holes Va2. In addition, the second metal member 220 can include a first short side 221 and a second short side 222. The first short side 221 is aligned to the short side of the first metal member 210 having the first feed point F1. The second short side 222 is aligned to another short side of the first metal member 210. A distance L1 between the second feed point F2 and the first short side 221 is greater than a distance L2 between the second feed point F2 and the second short side 222.

Each of the first diode 230 and the second diode 240 is a P-Intrinsic-N (P-I-N) diode. A first working state of the first diode 230 and a second working state of the second diode 240 are respectively controlled by the first input signal V1 and the second input signal V2. The radiation layer 200 is modulated according to the first working state and the second working state, so that the electromagnetic wave W forms one of a single-beam reflection and a dual-beam reflection after being incident on the radiation layer 200, or is absorbed by the radiation layer 200. Thus, the multifunctional RRA structure 100 of the present disclosure can use the first input signal V1 and the second input signal V2 to change the first working state of the first diode 230 and the second working state of the second diode 240 state to change the electromagnetic characteristics of the radiation layer 200, which is equivalent to modulating a reflection phase of the radiation layer 200, so that the electromagnetic wave W undergoes different propagation behaviors after being incident on the radiation layer 200. In other words, for the electromagnetic waves W in 5G NR band, the multifunctional RRA structure 100 can switch the radiation layer 200 among the three functions of single-beam forming, dual-beam forming and absorption according to user needs. Therefore, the RIS 10 composed of multiple multifunctional RRA structures 100 has the functions of simple structure, low-cost, low power consumption, and easy-to-deploy in any communication environment scenario.

In detail, the radiation layer 200 operates in one of a reflection mode and an absorption mode according to the first working state of the first diode 230 and the second working state of the second diode 240, as shown in Table 1 below. Table 1 lists the reflection mode and the absorption mode of the radiation layer 200 are compared with the first input signal V1, the second input signal V2, the first working state and the second working state.

TABLE 1

| Radiation layer | Reflection phase state | First input signal | Second input signal | First working state | Second working state |
|---|---|---|---|---|---|
| Reflection mode | 0° | 0 | 0 | OFF | OFF |
| | 180° | 1 | 0 | ON | OFF |
| Absorption mode | | 1 | 1 | ON | ON |

When the radiation layer 200 operates in the reflection mode and the reflection mode is a first reflection phase state (i.e., 0 degrees, which is expressed as) 0°, each of the first input signal V1 and the second input signal V2 is 0, so that each of the first working state and the second working state is an off state. When the radiation layer 200 operates in the reflection mode and the reflection mode is a second reflection phase state (i.e., 180 degrees, which is expressed as) 180°, the first input signal V1 is 1, so that the first working state is an on state, and the second input signal V2 is 0, so that the second working state is the off state. When the radiation layer 200 operates in the absorption mode, each of the first input signal V1 and the second input signal V2 is 1, so that each of the first working state and the second working state is the on state.

In the reflection mode, a reflection phase difference between the first reflection phase state and the second reflection phase state is 180°. The first reflection phase state represents that both the first diode 230 and the second diode 240 are OFF, and responsible for providing the 0° phase when the electromagnetic wave W is reflected. The second reflection phase state represents that the first diode 230 is ON and the second diode 240 is OFF, and which is responsible for providing the 180° phase when the electromagnetic wave W is reflected. Therefore, the main effect of the first diode 230 is to control beam forming. In the absorption mode, the first diode 230 and the second diode 240 are both ON, and their function is to absorb the electromagnetic wave W and increase the shielding effect on the electromagnetic wave W. Furthermore, when each of the first working state and the second working state is the on state, the absorption resistor 250 can be configured to block the induced current flowing through the first metal member 210 and the second metal member 220, so that the radiation layer 200 can obtain more reflection loss in the absorption mode, thereby achieving the function of absorbing the electromagnetic wave W.

Figure 5A:
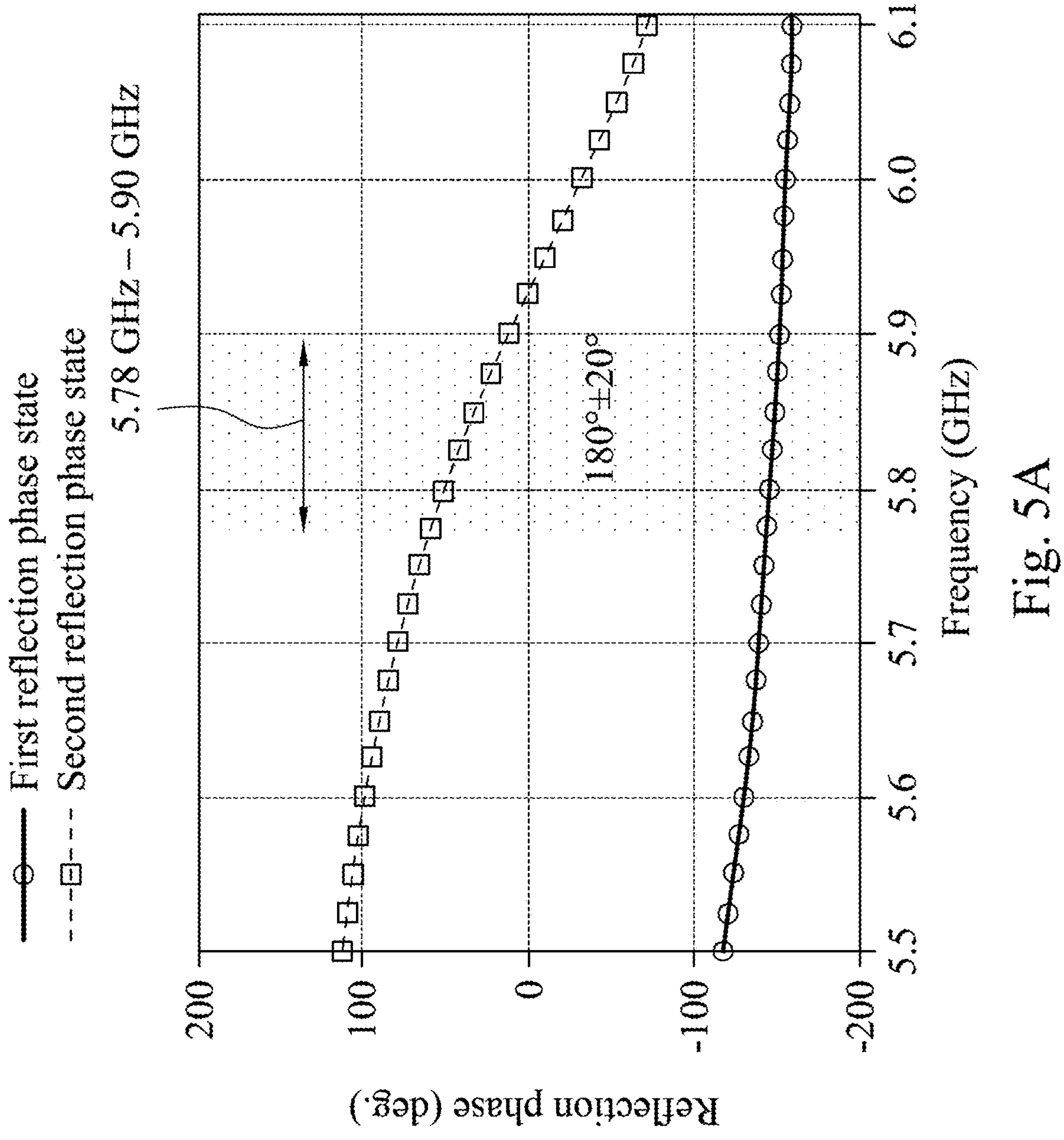
FIG. 5A shows a schematic simulation diagram of a reflection phase of the radiation layer of the multifunctional RRA structure in FIG. 2 operating in a reflection mode.
Figure 5B:
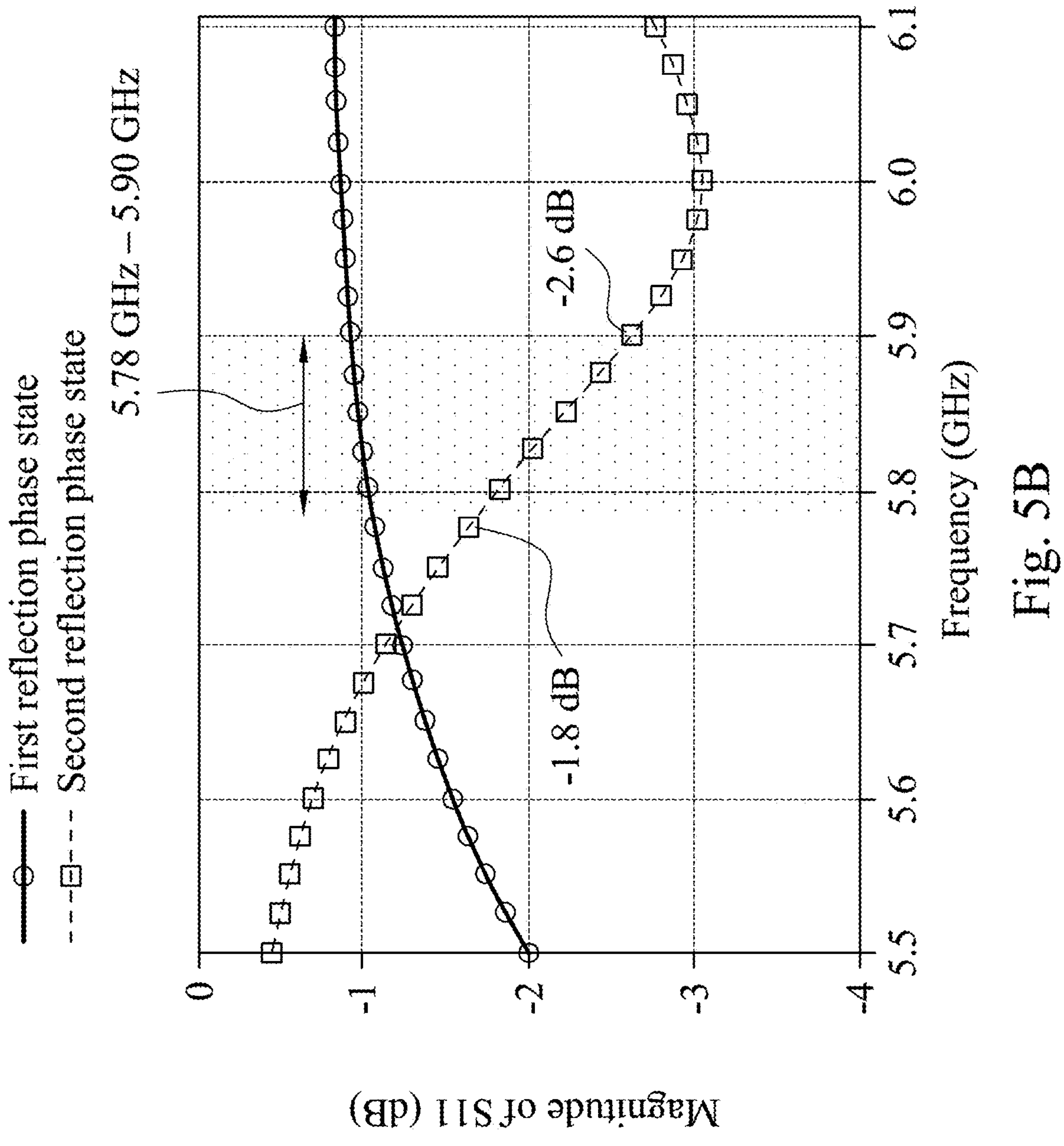
FIG. 5B shows a schematic simulation diagram of a reflection coefficient (the magnitude of S11) of the radiation layer of the multifunctional RRA structure in FIG. 2 operating in a reflection mode.
Figure 5C:
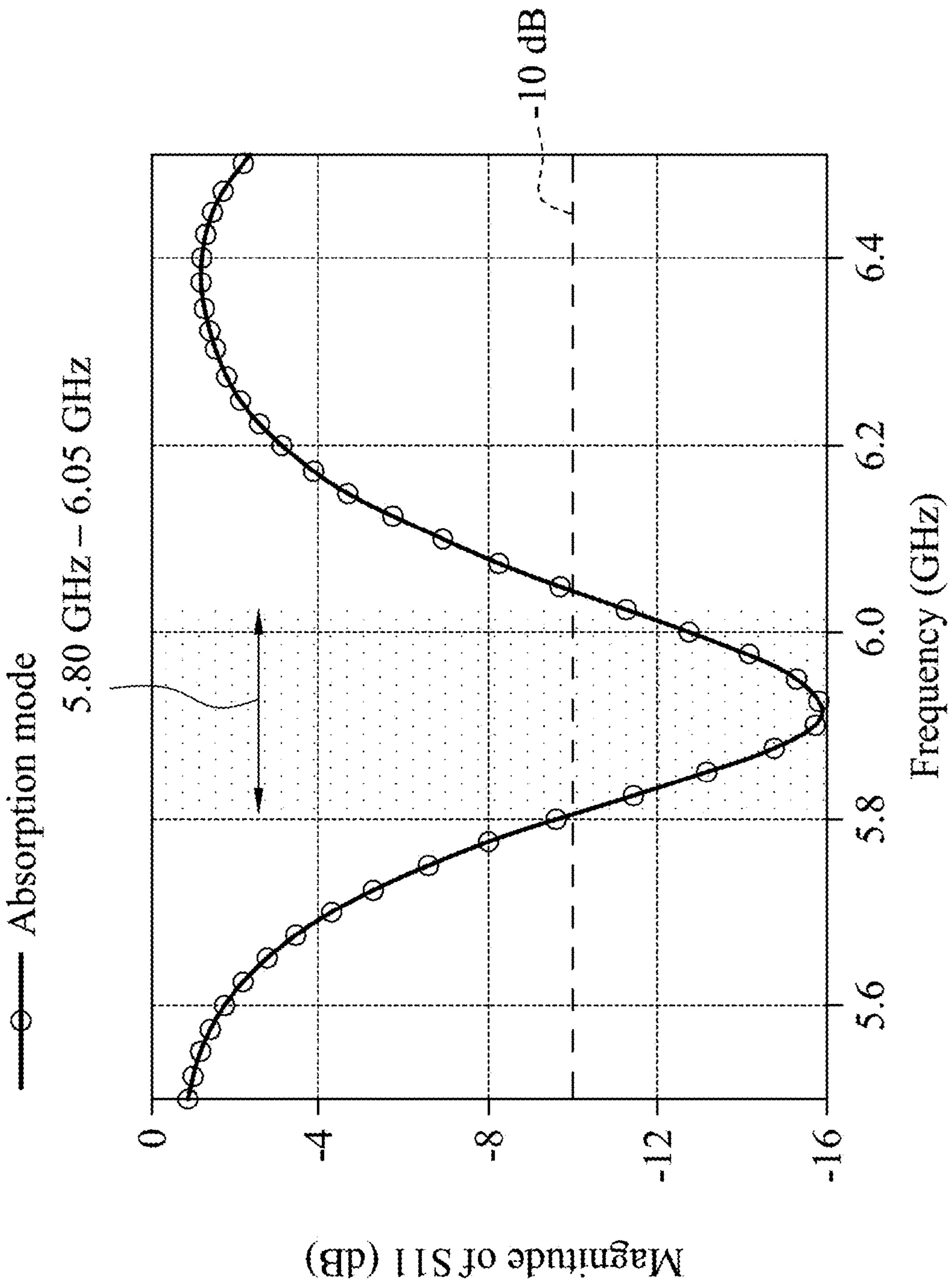
FIG. 5C shows a schematic simulation diagram of the magnitude of S11 of the radiation layer of the multifunctional RRA structure in FIG. 2 operating in an absorption mode.

Reference is made to FIGS. 5A, 5B and 5C. FIG. 5A shows a schematic simulation diagram of the reflection phase of the radiation layer 200 of the multifunctional RRA structure 100 in FIG. 2 operating in the reflection mode. FIG. 5B shows a schematic simulation diagram of a reflection coefficient (the magnitude of S11) of the radiation layer 200 of the multifunctional RRA structure 100 in FIG. 2 operating in the reflection mode. FIG. 5C shows a schematic simulation diagram of the magnitude of S11 of the radiation layer 200 of the multifunctional RRA structure 100 in FIG. 2 operating in the absorption mode.

As shown in FIG. 5A, when the radiation layer 200 operates in the reflection mode, a phase bandwidth of the multifunctional RRA structure 100 can be between 5.78 GHz to 5.90 GHz. The phase bandwidth is defined by the reflection phase difference between the first reflection phase state and the second reflection phase state, and the reflection phase difference must comply with 180°±20°. As shown in FIG. 5B, compared with the first reflection phase state, when the radiation layer 200 operates in the second reflection phase state, there is a larger reflection loss within the phase bandwidth, and the reflection coefficient (S11 parameter) is between −1.8 dB to −2.6 dB. As shown in FIG. 5C, the reflection loss of the radiation layer 200 in the absorption state is 10 dB. It should be noted that, the absorption rate formula is defined as Absorptivity=$1-\Gamma^2$, wherein Absorptivity represents an absorption rate, $\Gamma$ represents the reflection coefficient. According to the aforementioned absorption rate formula, it can be concluded that the absorption rate is greater than 90% when the reflection loss is greater than 10 dB (that is, the dotted line in FIG. 5C). Therefore, the absorption rate of the multifunctional RRA structure 100 is greater than 90% at frequencies between 5.80 GHz to 6.05 GHz.

Figure 6:
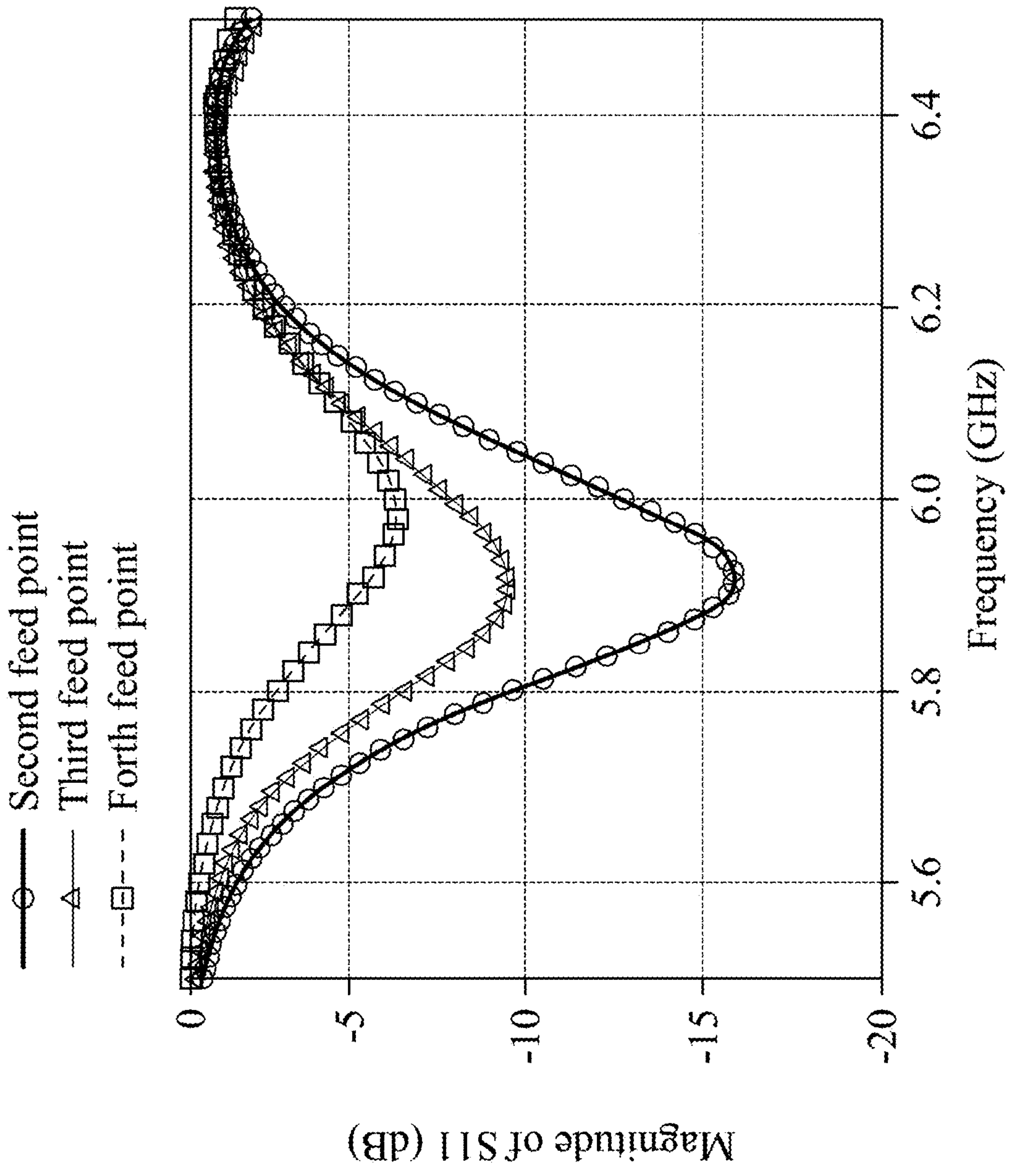
FIG. 6 shows a schematic measurement diagram of the magnitude of S11 of the multifunctional RRA structure in FIG. 2 corresponding to different feed points.
Figure 7:
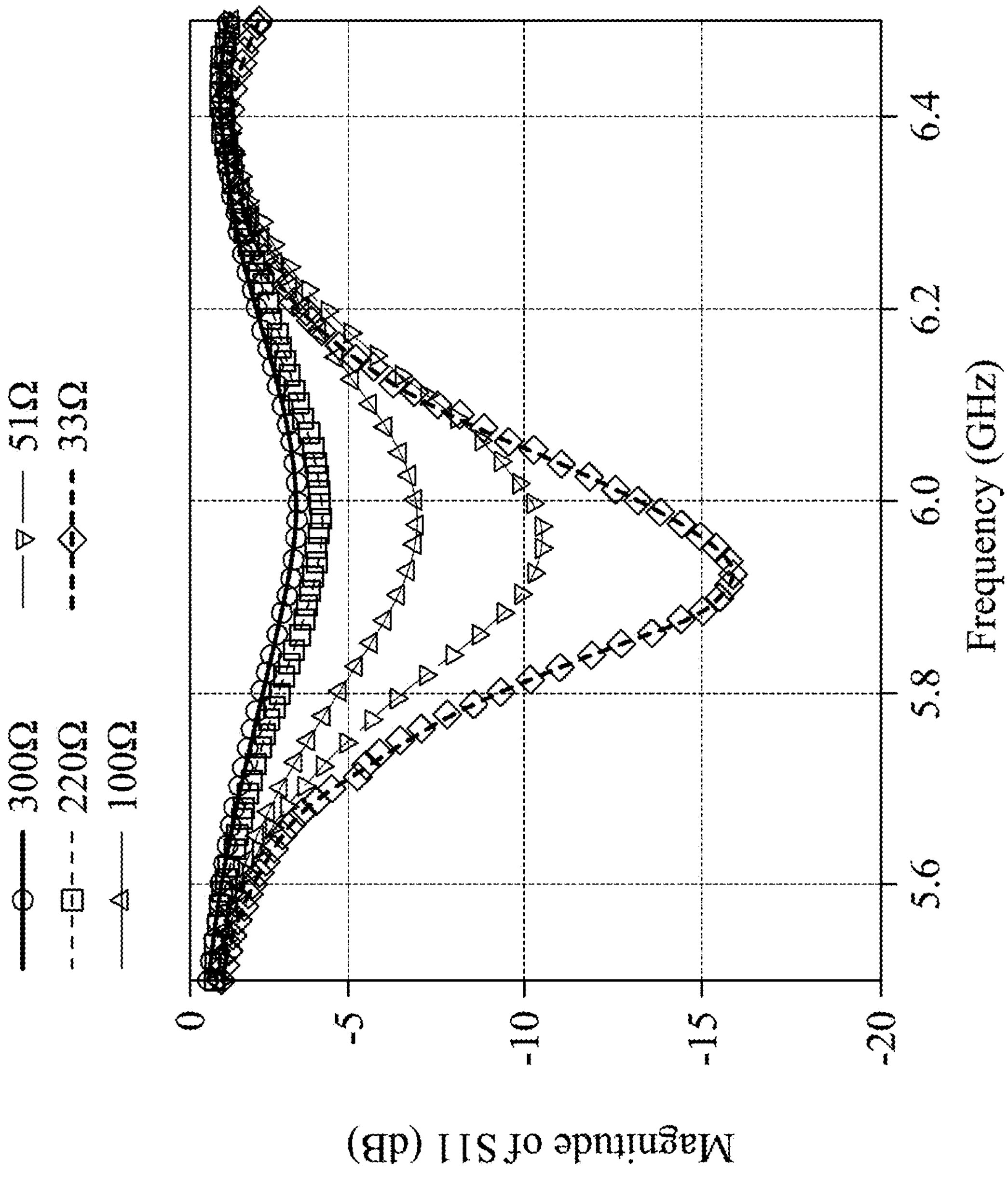
FIG. 7 shows a schematic measurement diagram of the magnitude of S11 of the multifunctional RRA structure in FIG. 2 corresponding to different resistance values.

Reference is made to FIGS. 6 and 7. FIG. 6 shows a schematic measurement diagram of the magnitude of S11 of the multifunctional RRA structure 100 in FIG. 2 corresponding to different feed points. FIG. 7 shows a schematic measurement diagram of the magnitude of S11 of the multifunctional RRA structure 100 in FIG. 2 corresponding to different resistance values. In order to explore the impact of the feed position on the multifunctional RRA structure 100, the present disclosure imports the data of the multifunctional RRA structure 100 into a simulation software tool, and uses the simulation software tool to set two additional feed positions (i.e., a third feed point F3 and a fourth feed point F4, as shown in FIG. 4) on the second metal member 220 of the radiation layer 200. The second input signal V2 (i.e. 1) is input to the positions of the second feed point F2, the third feed point F3 and the fourth feed point F4, and then it can be observed that different feed positions have different effects on the radiation layer 200 operating in the absorption mode. Impact. In FIG. 6, as the feed position moves from the second feed point F2 to the fourth feed point F4, the absorption effect gradually becomes worse. From the perspective of the induced current, when the feed position is the fourth feed point F4, most of the induced current flows to the ground instead of flowing to the absorption resistor 250, so the energy cannot be completely absorbed. On the contrary, when the feed position is the second feed point F2, the absorption effect is better because the surface current passes through a larger resistance. Based on the above considerations, the feeding position of the second input signal V2 is set as the second feeding point F2 in the present disclosure.

In order to allow the induced current of the radiation layer 200 to flow into the absorption resistor 250 when the second diode 240 is turned on, the resistance value of the absorption resistor 250 needs to match the resistance value based on the second feed point F2 to ensure that most of the induced current can flow into the absorption resistor 250 when the second diode 240 is turned on. As shown in FIG. 7, the resistance value of the absorption resistor 250 is selected to be 33Ω for the best absorption effect. On the other hand, in order to avoid plate bending during the manufacturing process of the multifunctional RRA structure 100, a total thickness of the radiation layer 200 and the dielectric layer 300 is equal to a thickness of the DC bias layer 600, and both the thicknesses can be 1.524 mm. The thicknesses of the two substrates 510 of the radio frequency suppression layer 500 are the same as each other and can be 0.3 mm, but the present disclosure is not limited thereto. The array simulation of single-beam reflection and dual-beam reflection formed after the electromagnetic wave W is incident on the radiation layer 200 will be explained in detail with figures below.

Figure 8A:
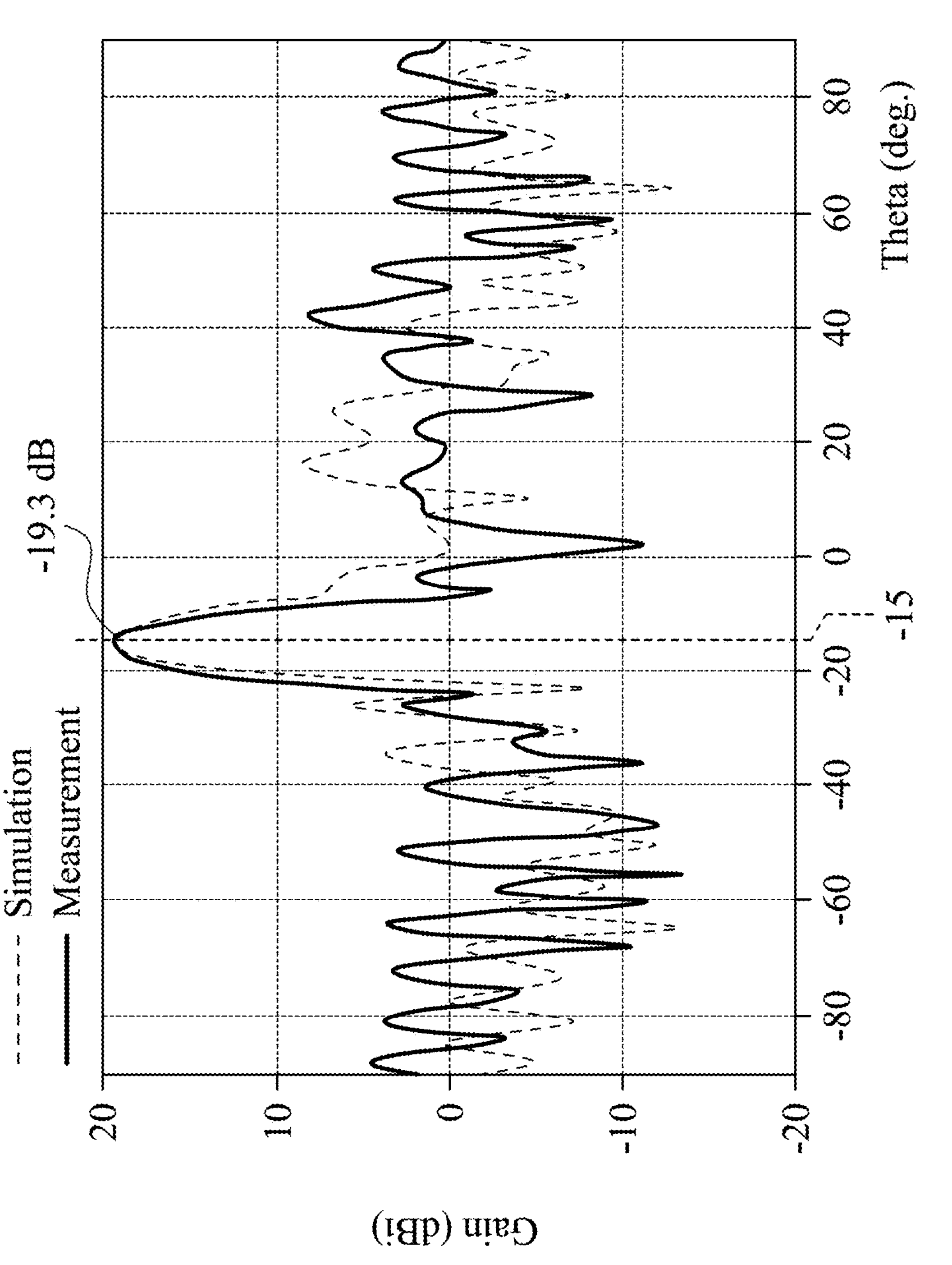
FIG. 8A shows a simulation-measurement comparison diagram of a radiation field pattern formed by a single-beam reflection after the radiation layer of the multifunctional RRA structure in FIG. 2 receiving an electromagnetic wave.
Figure 8B:
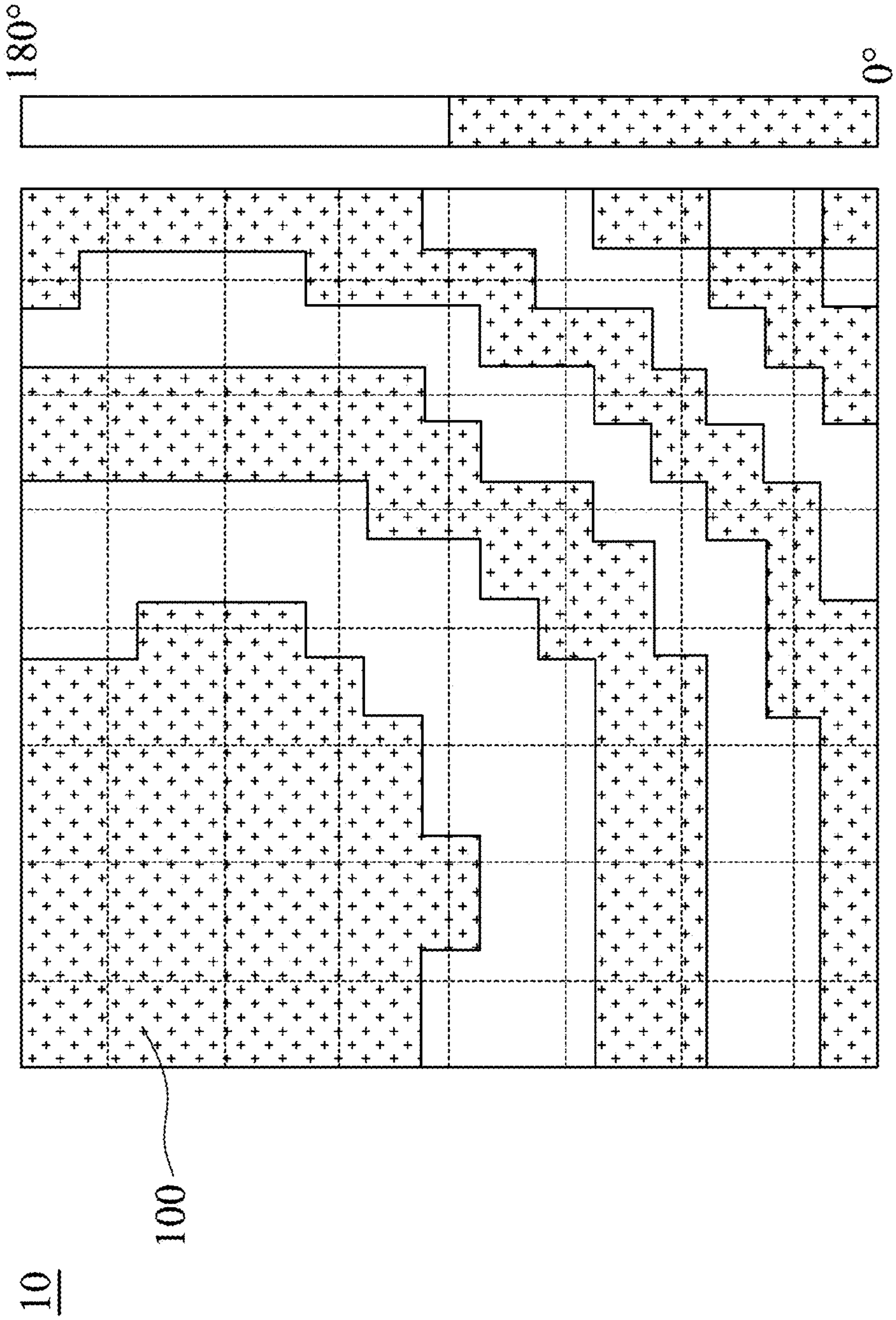
FIG. 8B shows a schematic view of a binary phase distribution of the RIS in FIG. 1 corresponding to the single-beam reflection.
Figure 9A:
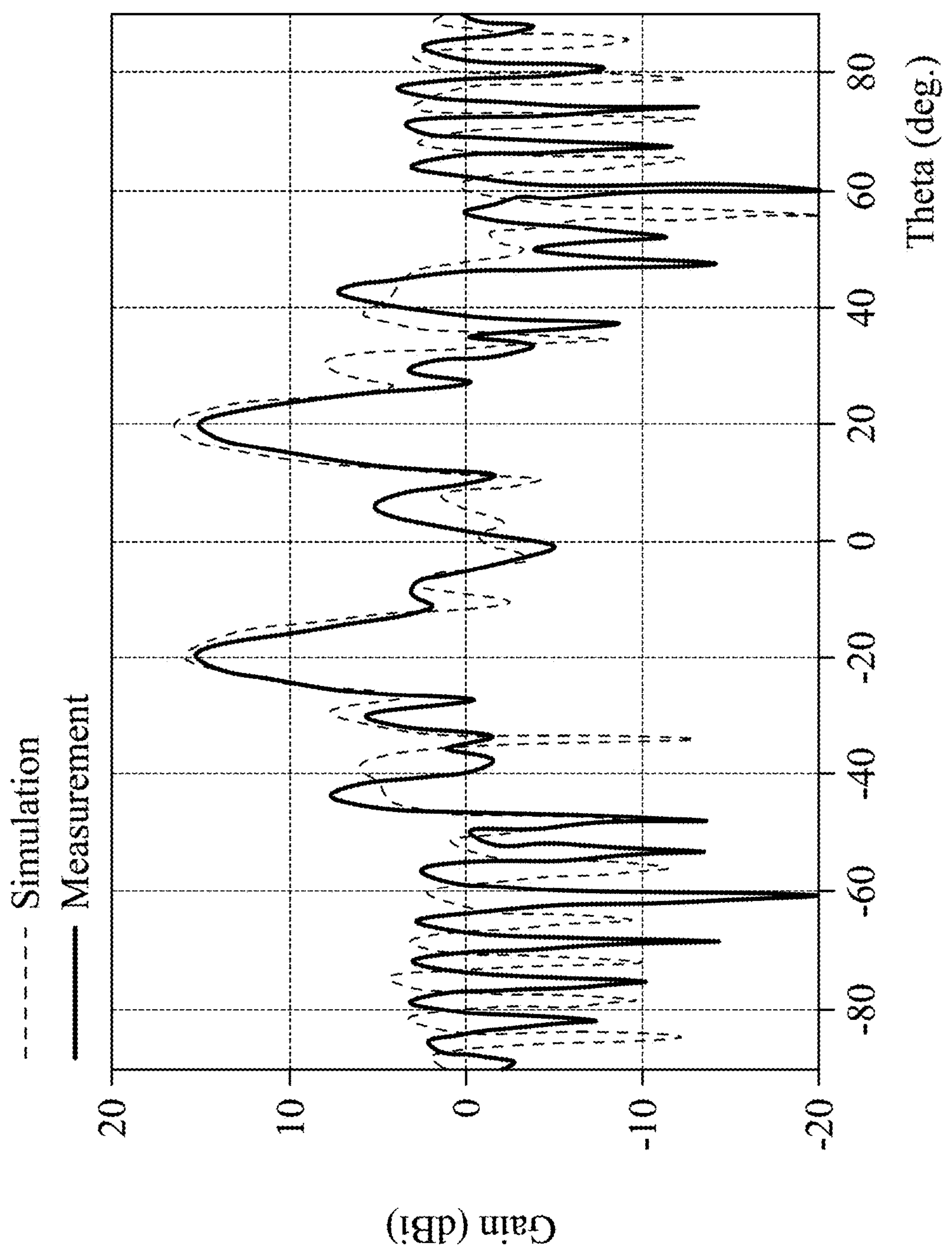
FIG. 9A shows a simulation-measurement comparison diagram of a radiation field pattern formed by a dual-beam reflection after the radiation layer of the multifunctional RRA structure in FIG. 2 receiving the electromagnetic wave.
Figure 9B:
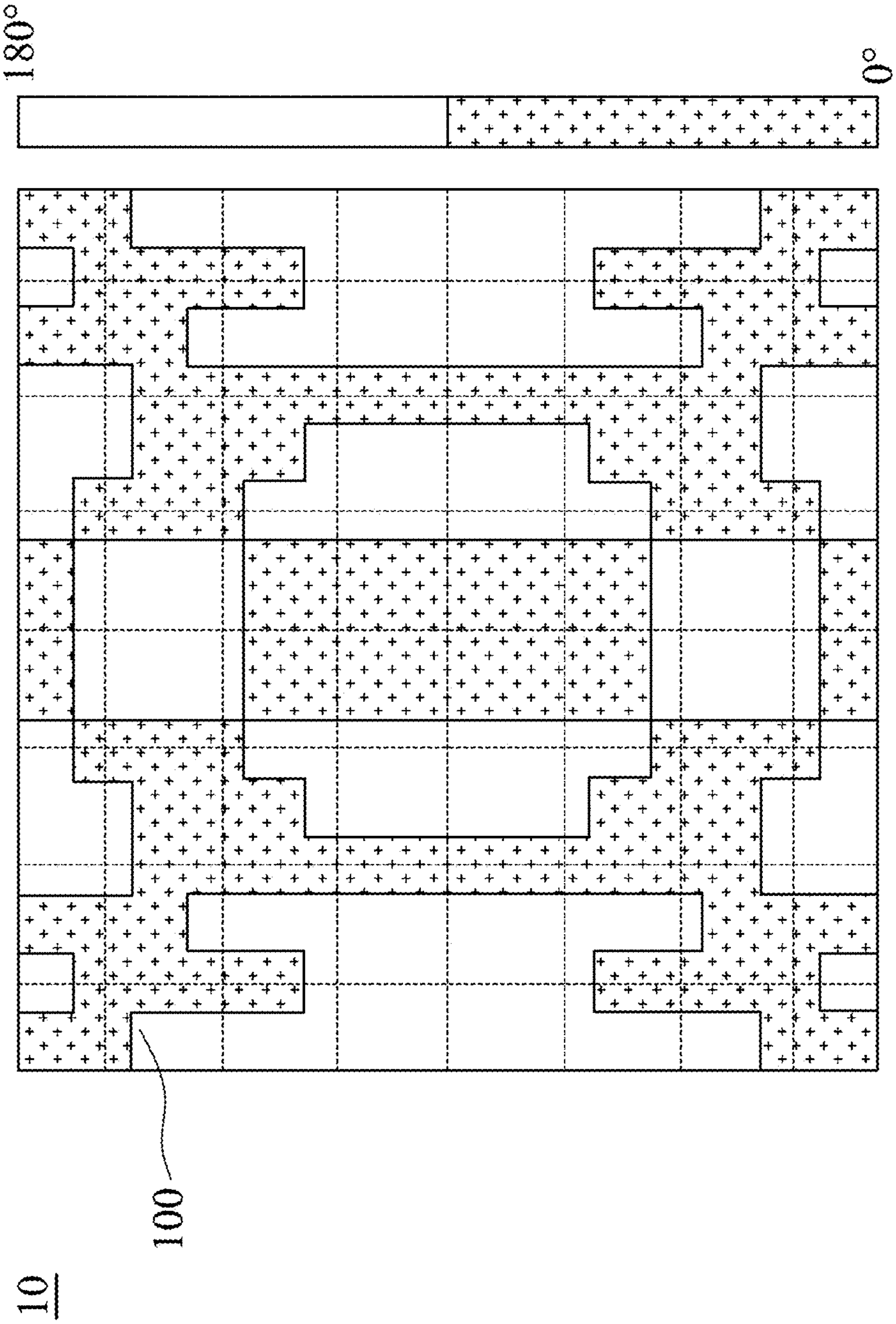
FIG. 9B shows a schematic view of a binary phase distribution of the RIS in FIG. 1 corresponding to the dual-beam reflection.

Reference is made to FIGS. 1 to 4, 8A, 8B, 9A and 9B. FIG. 8A shows a simulation-measurement comparison diagram of a radiation field pattern formed by the single-beam reflection after the radiation layer 200 of the multifunctional RRA structure 100 in FIG. 2 receiving the electromagnetic wave W. FIG. 8B shows a schematic view of the binary phase distribution of the RIS 10 in FIG. 1 corresponding to the single-beam reflection. FIG. 9A shows a simulation-measurement comparison diagram of a radiation field pattern formed by the dual-beam reflection after the radiation layer 200 of the multifunctional RRA structure 100 in FIG. 2 receiving the electromagnetic wave W. FIG. 9B shows a schematic view of a binary phase distribution of the RIS 10 in FIG. 1 corresponding to the dual-beam reflection.

It should be noted that, there can be an incident distance D between the electromagnetic wave source S in FIG. 1 and the radiation layer 200 of the multifunctional RRA structure 100. The electromagnetic wave W is incident on the radiation layer 200 at an incident angle $\theta_i$ and then reflected at a reflection angle $\theta_r$. The radiation layer 200 is configured such that the electromagnetic wave W forms one of the single-beam reflection and the dual-beam reflection according to the first working state and the second working state after being incident on the radiation layer 200.

Further, the present disclosure binarizes the reflection phase of the radiation layer 200 of each of the multifunctional RRA structures 100 of the RIS 10, that is, taking the RIS 10 as an example based on one bit. Since the reflection phase can only switch between two states (i.e., reflection phase 0° and reflection phase) 180°, the reflection phase of the radiation layer 200 must be binary quantified, as shown in the following equation (1):

$$\emptyset_{mn} = \begin{cases} \pi, & 0 \le \emptyset_{mn} \le \pi \\ 0, & \text{elsewhere} \end{cases},$$

wherein $\emptyset_{mn}$ represents the reflection phase of the radiation layer 200.

In FIG. 8A, the incident angle $\theta_i$ of the electromagnetic wave W can be 15°, the reflection angle $\theta_r$ can be −15°, and the number of reflections is 1. Therefore, the electromagnetic wave W can form the single-beam reflection after being incident on the radiation layer 200. At this time, the maximum gain is 19.3 dBi after simulating and measuring the single-beam reflection. The binary phase distribution corresponding to the single-beam reflection of the RIS 10 is shown in FIG. 8B, wherein the gray background in FIG. 8B represents the reflection phase of the radiation layer 200 that is binarized and classified into the reflection phase 0°, and the white background represents that the reflection phase of the radiation layer 200 is binarized and classified into the reflection phase 180°.

In FIG. 9A, the incident angle $\theta_i$ of the electromagnetic wave W can be 0°, the reflection angle $\theta_r$ can be ±20°, and the number of reflections is 2. Therefore, the electromagnetic wave W can form the dual-beam reflection after being incident on the radiation layer 200. At this time, the maximum gain is between 15.1 dBi to 16.0 dBi after simulating and measuring the dual-beam reflection. The binary phase distribution corresponding to the dual-beam reflection of the RIS 10 is shown in FIG. 9B, wherein the gray background in FIG. 9B represents the reflection phase of the radiation layer 200 that is binarized and classified into the reflection phase 0°, and the white background represents that the reflection phase of the radiation layer 200 is binarized and classified into the reflection phase 180°.

Figure 10:
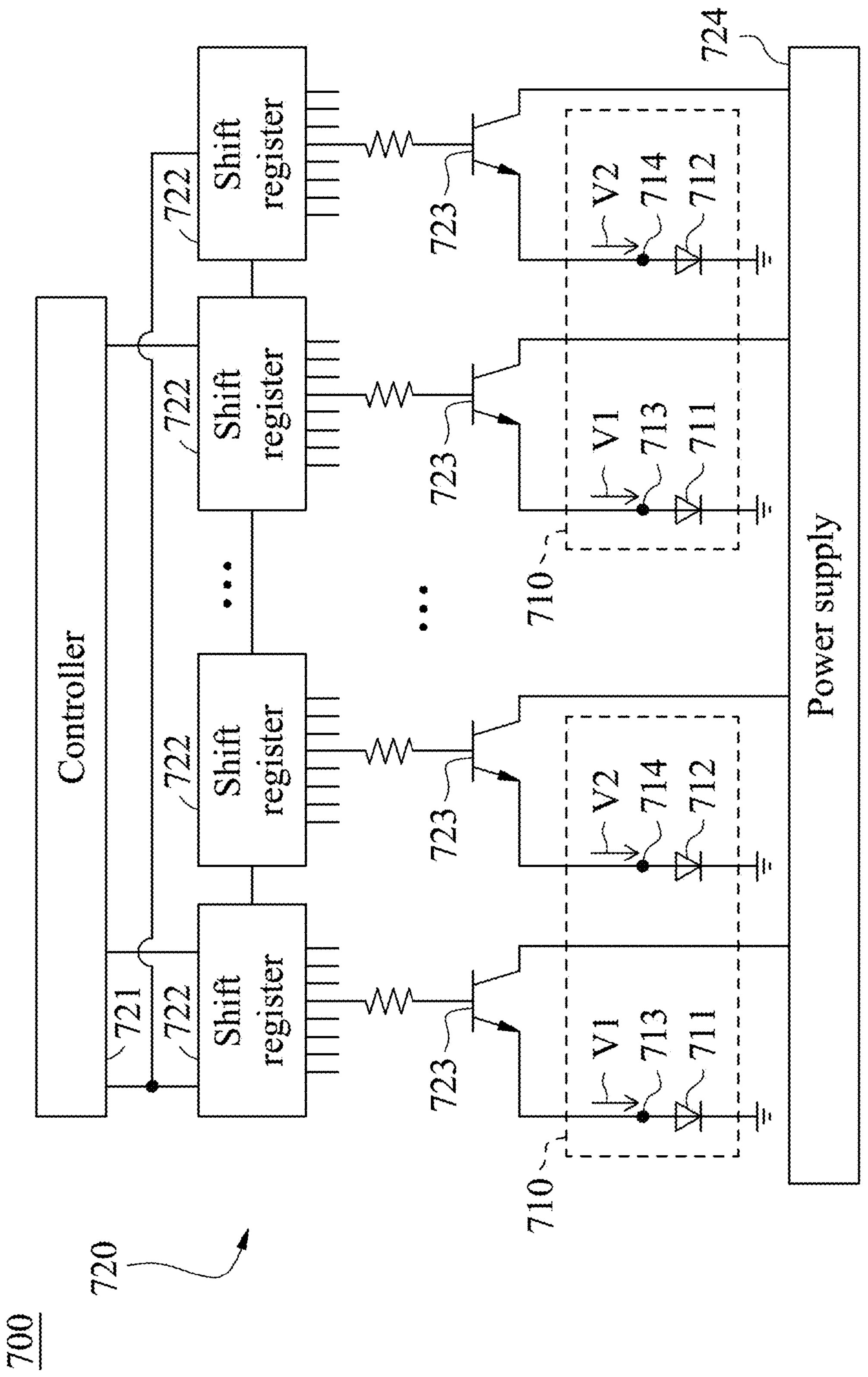
FIG. 10 shows a schematic view of a control circuit having the multifunctional RRA structure according to a second embodiment of the present disclosure.

Reference is made to FIG. 10. FIG. 10 shows a schematic view of a control circuit 700 having a multifunctional RRA structure 710 according to a second embodiment of the present disclosure. The control circuit 700 includes a plurality of the multifunctional RRA structures 710 and a control module 720. The multifunctional RRA structure 710 of the second embodiment can be the multifunctional RRA structure 100 of the first embodiment. Each of the multifunctional RRA structures 710 includes a first diode 711 and a second diode. 712, a first voltage input end 713 and a second voltage input end 714. The first voltage input end 713 is electrically connected to the first diode 711, the second voltage input end 714 is electrically connected to the second diode 712, and other structural details are not described again herein.

The control module 720 can be configured to control the multifunctional RRA structures 710 and electrically connected to the first voltage input end 713 and the second voltage input end 714 to respectively provide a first input signal V1 and a second input signal V2. A first working state of the first diode 711 and a second working state of the second diode 712 are respectively controlled by the first input signal V1 and the second input signal V2. The radiation layer of the multifunctional RRA structure 710 is modulated according to the first working state and the second working state, so that the electromagnetic wave forms one of a single-beam reflection and a dual-beam reflection after being incident on the radiation layer, or is absorbed by the radiation layer.

In detail, the control module 720 includes a controller 721, at least one shift register 722, at least one bipolar junction transistor (BJT) 723 and a power supply 724. The shift register 722 is electrically connected to the controller 721. A base end (B) of the BJT 723 is electrically connected to the shift register 722, and an emitter end (E) of the BJT 723 is electrically connected to the first voltage input end 713 and the second voltage input end 714. The power supply 724 is electrically connected to a collector end (C) of the BJT 723. The controller 721 controls the shift register 722 to generate the first input signal V1 and the second input signal V2. The controller 721 can be, but is not limited to a central processing unit (CPU), an embedded controller (EC), a microprocessor, or a digital signal processor (DSP), an application-specific integrated circuit (ASIC), a system on a chip (SoC) or other processing components and their combinations. In the second embodiment, the number of the shift registers 722 and the number of the BJTs 723 can be plural, and the number of the above two is determined by the number of the multifunctional RRA structures 710, and the present disclosure is not limited to the quantity of each component. Thus, the control circuit 700 of the present disclosure is integrated using easily available electronic components, and modulates the reflection phase of the radiation layer by changing the working state of the diode, so that electromagnetic waves in space undergoes different propagation behaviors after entering the radiation layer, which increases degrees of freedom for signal transmission.

According to the aforementioned embodiments and examples, the advantages of the present disclosure are described as follows.

1. For electromagnetic waves in 5G NR band, the radiation layer can be switched between three functions: single-beam forming, dual-beam forming and absorption according to user needs.

2. The RIS composed of the multifunctional RRA structures has the advantages of simple structure, low-cost, low power consumption, and easy-to-deploy in any communication environment scenario.

3. The RIS can be placed on the exterior walls of buildings and use absorption mode to shield electromagnetic waves, so that electromagnetic waves between indoors and outdoors are isolated from each other, thereby preventing third-party users from stealing information by using electromagnetic waves that penetrate indoors; further, the RIS can be installed indoors to increase communication isolation between different spaces in the indoor environment and reduce electromagnetic interference.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A multifunctional reconfigurable reflectarray (RRA) structure, comprising:

a radiation layer configured to receive an electromagnetic wave from an electromagnetic wave source, and comprising:

a first metal member;

a second metal member symmetrically disposed with the first metal member;

a first diode connected between the first metal member and the second metal member; and a second diode coupled to the second metal member; and a direct current bias layer comprising:

a first voltage input end electrically connected to the first diode and providing a first input signal; and a second voltage input end electrically connected to the second diode and providing a second input signal;

wherein a first working state of the first diode and a second working state of the second diode are respectively controlled by the first input signal and the second input signal, and the radiation layer is modulated according to the first working state and the second working state, so that the radiation layer selectively operates in one of a single-beam reflection mode, a dual-beam reflection mode and an absorption mode;

wherein each of the first metal member and the second metal member has a rectangular shape, a short side of the first metal member has a first feed point, which is electrically connected to the first voltage input end through two first conductive via holes, and a long side of the second metal member has a second feed point, which is coupled to the second diode and electrically connected to the second voltage input end through two second conductive via holes.

2. The multifunctional RRA structure of claim 1, wherein the second metal member comprises:

a first short side aligned to the short side of the first metal member; and a second short side aligned to another short side of the first metal member;

wherein a distance between the second feed point and the first short side is greater than a distance between the second feed point and the second short side.

3. The multifunctional RRA structure of claim 1, wherein the radiation layer further comprises:

an absorption resistor connected between the second metal member and the second diode;

wherein when each of the first working state and the second working state is an on state, the absorption resistor absorbs the electromagnetic wave.

4. The multifunctional RRA structure of claim 1, further comprising:

a dielectric layer, wherein an upper surface of the dielectric layer is connected to the radiation layer;

a first ground layer, wherein an upper surface of the first ground layer is connected to a lower surface of the dielectric layer;

a radio frequency suppression layer, wherein an upper surface of the radio frequency suppression layer is connected to a lower surface of the first ground layer; and a second ground layer, wherein an upper surface of the second ground layer is connected to a lower surface of the radio frequency suppression layer, and a lower surface of the second ground layer is connected to the direct current bias layer.

5. The multifunctional RRA structure of claim 4, wherein the radio frequency suppression layer comprises:

two substrates stacked on each other; and two radio frequency choke units disposed between the two substrates, wherein the two radio frequency choke units are configured to suppress a high-frequency signal of the radiation layer from flowing into the direct current bias layer, and each of the two radio frequency choke units has a fan shape.

6. The multifunctional RRA structure of claim 4, wherein a total thickness of the radiation layer and the dielectric layer is equal to a thickness of the direct current bias layer.

7. The multifunctional RRA structure of claim 1, wherein each of the first diode and the second diode is a P-Intrinsic-N (P-I-N) diode.

8. A control circuit having a multifunctional reconfigurable reflectarray (RRA) structure, comprising:

the multifunctional RRA structure, comprising:

a radiation layer configured to receive an electromagnetic wave from an electromagnetic wave source, and comprising:

a first metal member;

a second metal member symmetrically disposed with the first metal member;

a first diode connected between the first metal member and the second metal member; and a second diode coupled to the second metal member; and a direct current bias layer comprising:

a first voltage input end electrically connected to the first diode; and a second voltage input end electrically connected to the second diode; and a control module connected to the first voltage input end and the second voltage input end to respectively provide a first input signal and a second input signal;

wherein a first working state of the first diode and a second working state of the second diode are respectively controlled by the first input signal and the second input signal, and the radiation layer is modulated according to the first working state and the second working state, so that the radiation layer selectively operates in one of a single-beam reflection mode, a dual-beam reflection mode and an absorption mode;

wherein each of the first metal member and the second metal member has a rectangular shape, a short side of the first metal member has a first feed point, which is electrically connected to the first voltage input end through two first conductive via holes, and a long side of the second metal member has a second feed point, which is coupled to the second diode and electrically connected to the second voltage input end through two second conductive via holes.

9. The control circuit having the multifunctional RRA structure of claim 8, wherein the control module comprises:

a controller;

a shift register connected to the controller;

a bipolar junction transistor (BJT), wherein a base end of the BJT is connected to the shift register, and an emitter end of the BJT is connected to the first voltage input end and the second voltage input end; and a power supply connected to a collector end of the BJT;

wherein the controller controls the shift register to generate the first input signal and the second input signal.

10. The control circuit having the multifunctional RRA structure of claim 8, wherein the second metal member comprises:

a first short side aligned to the short side of the first metal member; and a second short side aligned to another short side of the first metal member;

wherein a distance between the second feed point and the first short side is greater than a distance between the second feed point and the second short side.

11. The control circuit having the multifunctional RRA structure of claim 8, wherein the radiation layer further comprises:

an absorption resistor connected between the second metal member and the second diode;

wherein when each of the first working state and the second working state is an on state, the absorption resistor absorbs the electromagnetic wave.

12. The control circuit having the multifunctional RRA structure of claim 8, wherein the multifunctional RRA structure further comprises:

a dielectric layer, wherein an upper surface of the dielectric layer is connected to the radiation layer;

a first ground layer, wherein an upper surface of the first ground layer is connected to a lower surface of the dielectric layer;

a radio frequency suppression layer, wherein an upper surface of the radio frequency suppression layer is connected to a lower surface of the first ground layer; and a second ground layer, wherein an upper surface of the second ground layer is connected to a lower surface of the radio frequency suppression layer, and a lower surface of the second ground layer is connected to the direct current bias layer.

13. The control circuit having the multifunctional RRA structure of claim 12, wherein the radio frequency suppression layer comprises:

two substrates stacked on each other; and two radio frequency choke units disposed between the two substrates, wherein the two radio frequency choke units are configured to suppress a high-frequency signal of the radiation layer from flowing into the direct current bias layer, and each of the two radio frequency choke units has a fan shape.

14. The control circuit having the multifunctional RRA structure of claim 12, wherein a total thickness of the radiation layer and the dielectric layer is equal to a thickness of the direct current bias layer.

* * * * *